(12) United States Patent
Takahashi

(10) Patent No.: US 10,645,323 B2
(45) Date of Patent: May 5, 2020

(54) IMAGE SENSOR COMPRISING LOGIC GATES, PROCESSING METHOD FOR REDUCING POWER CONSUMPTION BASED ON A LOGIC GATE COMPUTATION, AND ELECTRONIC APPARATUS

(71) Applicant: SONY CORPORATION, Tokyo (JP)

(72) Inventor: Tomohiro Takahashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 101 days.

(21) Appl. No.: 15/559,388

(22) PCT Filed: Mar. 15, 2016

(86) PCT No.: PCT/JP2016/058067
§ 371 (c)(1),
(2) Date: Sep. 18, 2017

(87) PCT Pub. No.: WO2016/152635
PCT Pub. Date: Sep. 29, 2016

(65) Prior Publication Data
US 2018/0077374 A1    Mar. 15, 2018

(30) Foreign Application Priority Data
Mar. 26, 2015 (JP) .................. 2015-063825

(51) Int. Cl.
*H04N 5/3745* (2011.01)
*H04N 5/378* (2011.01)
(Continued)

(52) U.S. Cl.
CPC ....... *H04N 5/37455* (2013.01); *G06F 1/3206* (2013.01); *H04N 5/23241* (2013.01);
(Continued)

(58) Field of Classification Search
CPC .. H04N 5/37455; H04N 5/378; H04N 5/3454; H04N 5/3698; H04N 5/23241;
(Continued)

(56) References Cited

U.S. PATENT DOCUMENTS 6,567,571 B1 * 5/2003 Kochi ................. H04N 5/335
250/201.8
2003/0052252 A1  3/2003 Sugiyama et al.
(Continued)

FOREIGN PATENT DOCUMENTS

JP   2000-013694 A   1/2000
JP   2003-169251 A   6/2003
(Continued)

OTHER PUBLICATIONS

International Search Report and Written Opinion of PCT Application No. PCT/JP2016/058067, dated Apr. 12, 2016, 10 pages of ISRWO.

Primary Examiner — Twyler L Haskins
Assistant Examiner — Akshay Trehan
(74) Attorney, Agent, or Firm — Chip Law Group

(57) ABSTRACT

The present technology relates to an image sensor, a processing method, and an electronic apparatus that enable reduction of power consumption. An image sensor has signal processing units each responsible for signal processing of the pixel signal output from a pixel in one of pixel blocks each made up of one or more pixels, on each of which a plurality of pixels that performs photoelectric conversion and outputs a pixel signal is two-dimensionally arranged, the signal processing units being the same in number as the number of the pixel blocks and two-dimensionally arranged; horizontal control lines being the same in number as the number in a vertical direction of the signal processing units; vertical control lines being the same in number as the number in a horizontal direction of the signal processing (Continued)

units; and a computation unit that performs a computation using a horizontal control signal supplied via each of the horizontal control lines and a vertical control signal supplied via each of the vertical control lines as inputs. Each of the signal processing units works in accordance with a result of the computation. The present technology can be applied to, for example, an image sensor for capturing images.

7 Claims, 12 Drawing Sheets

(51) Int. Cl.
*H04N 5/345* (2011.01)
*H04N 5/232* (2006.01)
*H04N 5/369* (2011.01)
*G06F 1/3206* (2019.01)

(52) U.S. Cl.
CPC ..... *H04N 5/232411* (2018.08); *H04N 5/3454* (2013.01); *H04N 5/369* (2013.01); *H04N 5/3698* (2013.01); *H04N 5/378* (2013.01); *H04N 5/379* (2018.08)

(58) Field of Classification Search
CPC .......... H04N 5/369; H04N 5/379; G06F 1/26; G06F 1/32; G06F 1/3203; G06F 1/3293; G06F 1/3287; G06F 1/3243

USPC .................................................... 348/333.13
See application file for complete search history.

(56) References Cited

U.S. PATENT DOCUMENTS

| | | | |
|---|---|---|---|
| 2004/0021788 A1* | 2/2004 | Shizukuishi | H04N 3/155 348/311 |
| 2012/0199724 A1* | 8/2012 | Nomura | H04N 5/3454 250/208.1 |
| 2013/0068929 A1 | 3/2013 | Solhusvik et al. | |
| 2015/0163403 A1 | 6/2015 | Wakabayashi | |
| 2015/0181149 A1* | 6/2015 | Awatani | H04N 5/37455 348/300 |
| 2015/0281615 A1* | 10/2015 | Kobayashi | H04N 5/378 348/322 |
| 2015/0373290 A1* | 12/2015 | Vogelsang | H04N 5/378 348/302 |
| 2016/0150171 A1* | 5/2016 | Raynor | H04N 5/345 348/302 |
| 2016/0248990 A1* | 8/2016 | Kim | H04N 5/378 |

FOREIGN PATENT DOCUMENTS

| | | | | |
|---|---|---|---|---|
| JP | 2006-203736 A | | 8/2006 | |
| JP | WO2014007004 | * | 1/2014 | ........... H04N 5/374 |
| JP | 2014-531820 A | | 11/2014 | |
| WO | 2014/007004 A1 | | 1/2014 | |

* cited by examiner

IMAGE SENSOR COMPRISING LOGIC GATES, PROCESSING METHOD FOR REDUCING POWER CONSUMPTION BASED ON A LOGIC GATE COMPUTATION, AND ELECTRONIC APPARATUS

CROSS REFERENCE TO RELATED APPLICATIONS

This application is a U.S. National Phase of International Patent Application No. PCT/JP2016/058067 filed on Mar. 15, 2016, which claims priority benefit of Japanese Patent Application No. JP 2015-063825 filed in the Japan Patent Office on Mar. 26, 2015. Each of the above-referenced applications is hereby incorporated herein by reference in its entirety.

TECHNICAL FIELD

The present technology relates to an image sensor, a processing method, and an electronic apparatus and, in particular, to an image sensor, a processing method, and an electronic apparatus that enable reduction of power consumption.

BACKGROUND ART

For example, Patent Document 1 has proposed, as an image sensor for capturing an image, an imaging sensor in which pixels are grouped such that an analog-to-digital (AD) converter (ADC) that performs AD conversion on pixel signals output by the pixels and a memory that stores pixel data obtained as a result of the AD conversion are provided in each group.

CITATION LIST

Patent Document

Patent Document 1: Japanese Patent Application Laid-Open No. 2006-203736

SUMMARY OF THE INVENTION

Problems to be Solved by the Invention

In the imaging sensor according to Patent Document 1, the ADCs of all groups work even in a case where the ADCs of some of the groups among the all groups are only required to work and consequently, unnecessary power is consumed.

The present technology has been made in view of such a situation and is intended to enable reduction of power consumption.

Solutions to Problems

An image sensor or an electronic apparatus according to the present technology is an image sensor or an electronic apparatus including such an image sensor including a pixel substrate on which a plurality of pixels that performs photoelectric conversion and outputs a pixel signal is two-dimensionally arranged, signal processing units each responsible for signal processing of the pixel signal output from a pixel in one of pixel blocks each made up of one or more pixels on the pixel substrate, the signal processing units being the same in number as the number of the pixel blocks and two-dimensionally arranged, horizontal control lines being the same in number as the number in a vertical direction of the signal processing units two-dimensionally arranged, vertical control lines being the same in number as the number in a horizontal direction of the signal processing units two-dimensionally arranged, and a computation unit that performs a computation using a horizontal control signal supplied via each of the horizontal control lines and a vertical control signal supplied via each of the vertical control lines as inputs, in which each of the signal processing units works in accordance with a result of the computation.

A processing method according to the present technology is a processing method including a step in which each of signal processing units of an image sensor works in accordance with a result of a computation, the image sensor including a pixel substrate on which a plurality of pixels that performs photoelectric conversion and outputs a pixel signal is two-dimensionally arranged, the signal processing units each responsible for signal processing of the pixel signal output from a pixel in one of pixel blocks each made up of one or more pixels on the pixel substrate, the signal processing units being the same in number as the number of the pixel blocks and two-dimensionally arranged, horizontal control lines being the same in number as the number in a vertical direction of the signal processing units two-dimensionally arranged, vertical control lines being the same in number as the number in a horizontal direction of the signal processing units two-dimensionally arranged, and a computation unit that performs the computation using a horizontal control signal supplied via each of the horizontal control lines and a vertical control signal supplied via each of the vertical control lines as inputs.

In the image sensor, the processing method, and the electronic apparatus of the present technology, a signal processing unit of the image sensor works in accordance with a result of the computation. The image sensor includes a pixel substrate on which a plurality of pixels that performs photoelectric conversion and outputs a pixel signal is two-dimensionally arranged, the signal processing units each responsible for signal processing of the pixel signal output from a pixel in one of pixel blocks each made up of one or more pixels on the pixel substrate, the signal processing units being the same in number as the number of the pixel blocks and two-dimensionally arranged, horizontal control lines being the same in number as the number in a vertical direction of the signal processing units two-dimensionally arranged, vertical control lines being the same in number as the number in a horizontal direction of the signal processing units two-dimensionally arranged, and a computation unit that performs the computation using a horizontal control signal supplied via each of the horizontal control lines and a vertical control signal supplied via each of the vertical control lines as inputs.

Note that the image sensor may be an independent device or an internal block constituting one device.

Effects of the Invention

According to the present technology, low power consumption can be achieved.

Note that, the effects described herein are not necessarily limited and any effects described in the present disclosure may be applied.

MODE FOR CARRYING OUT THE INVENTION

Embodiment of Image Sensor to Which Present Technology is Applied

Figure 1:
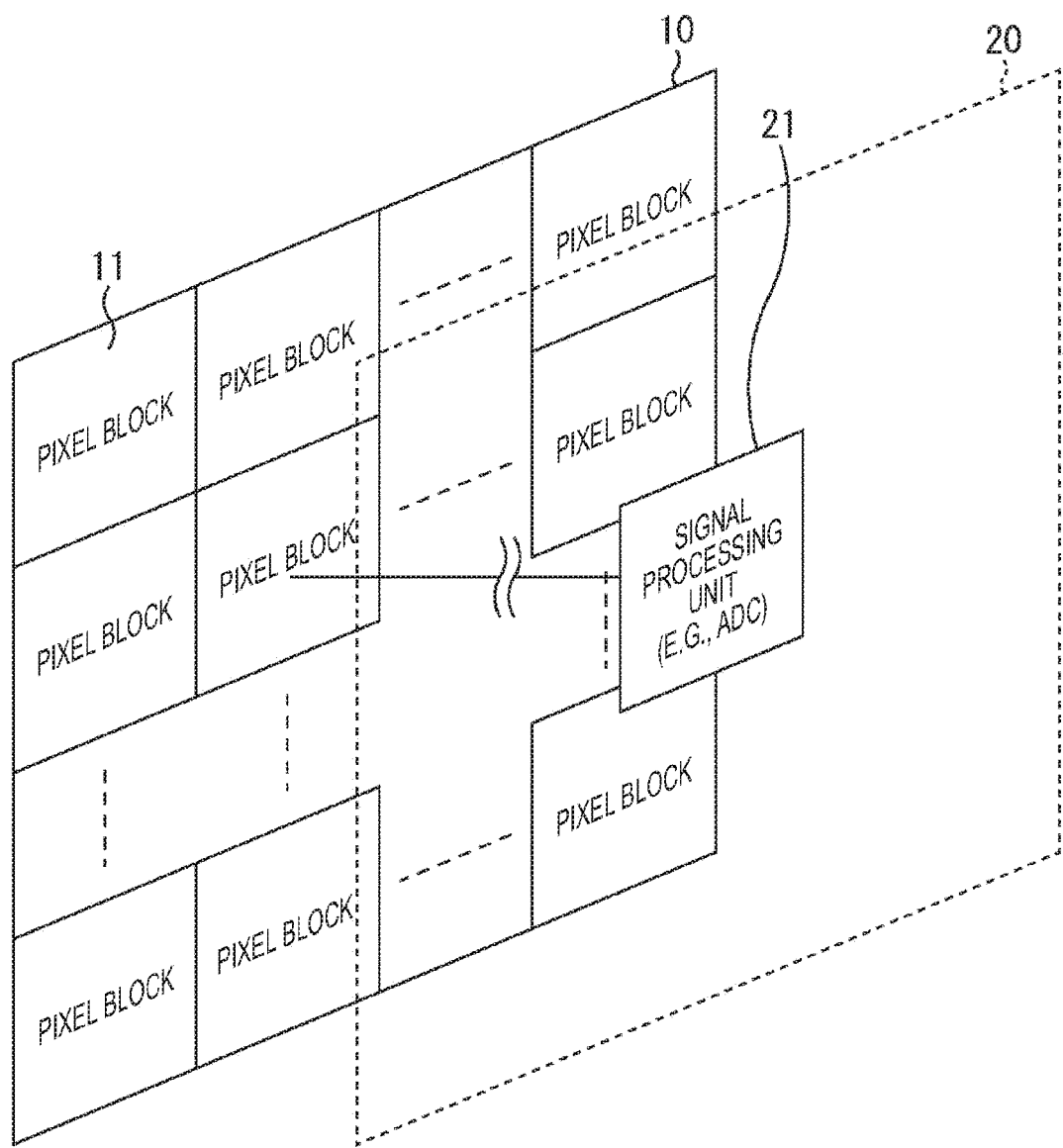
FIG. 1 is a perspective view illustrating a configuration example of an embodiment of an image sensor to which the present technology is applied.

FIG. 1 is a perspective view illustrating a configuration example of an embodiment of an image sensor to which the present technology is applied.

In FIG. 1, the image sensor is, for example, a complementary metal oxide semiconductor (CMOS) image sensor and has a two-layer structure.

That is, the image sensor is configured by laminating a pixel substrate 10 and a circuit substrate 20 which are (semiconductor) substrates.

On the pixel substrate 10, a plurality of pixels (not illustrated) that performs photoelectric conversion and outputs a pixel signal is arranged in, for example, a two-dimensional matrix form. The pixel signal obtained as a result of the photoelectric conversion in each pixel on the pixel substrate 10 is output to the circuit substrate 20.

Note that the plurality of pixels constituting the pixel substrate 10 is divided into pixel blocks 11 each made up of one or more pixels. In other words, the pixel substrate 10 is divided into M×N number of the pixel blocks 11 in a lateral direction×a longitudinal direction.

On the circuit substrate 20, M×N number of signal processing units 21 are configured in the lateral direction× the longitudinal direction.

The signal processing unit 21 performs signal processing such as AD conversion, correction of black level, and development on the pixel signal output from each pixel on the pixel substrate 10, as necessary.

Here, on the circuit substrate 20, one signal processing unit 21 has a size of a similar extent to that of one pixel block 11 and is disposed at a position facing one pixel block 11.

The signal processing unit 21 is responsible for signal processing of a pixel signal output by the (one or more) pixels constituting the pixel block 11 located at a position facing this signal processing unit 21.

This means that a collection of pixels for which one signal processing unit 21 is responsible for signal processing constitutes one pixel block 11.

Assuming for now that the signal processing unit 21 performs at least the AD conversion, the signal processing unit 21 is responsible for the AD conversion of a pixel signal output from pixels constituting the pixel block 11 located at a position facing this signal processing unit 21.

Such architecture for the AD conversion is called area AD conversion (ADC) architecture. According to the area ADC architecture, signal processing such as the AD conversion of pixel signals can be performed in parallel in the number equal to the number M×M of the signal processing units 21.

The signal processing unit 21 can be constituted by, for example, an AD converter that performs AD conversion of a pixel signal, and a memory that stores pixel data obtained by the AD conversion.

In this case, the memory constituting the signal processing unit 21 is provided on a different substrate from the circuit substrate 20 such that the image sensor can be configured in a three-layer structure in which the pixel substrate 10, the circuit substrate 20, and the different substrate are laminated.

Figure 2:
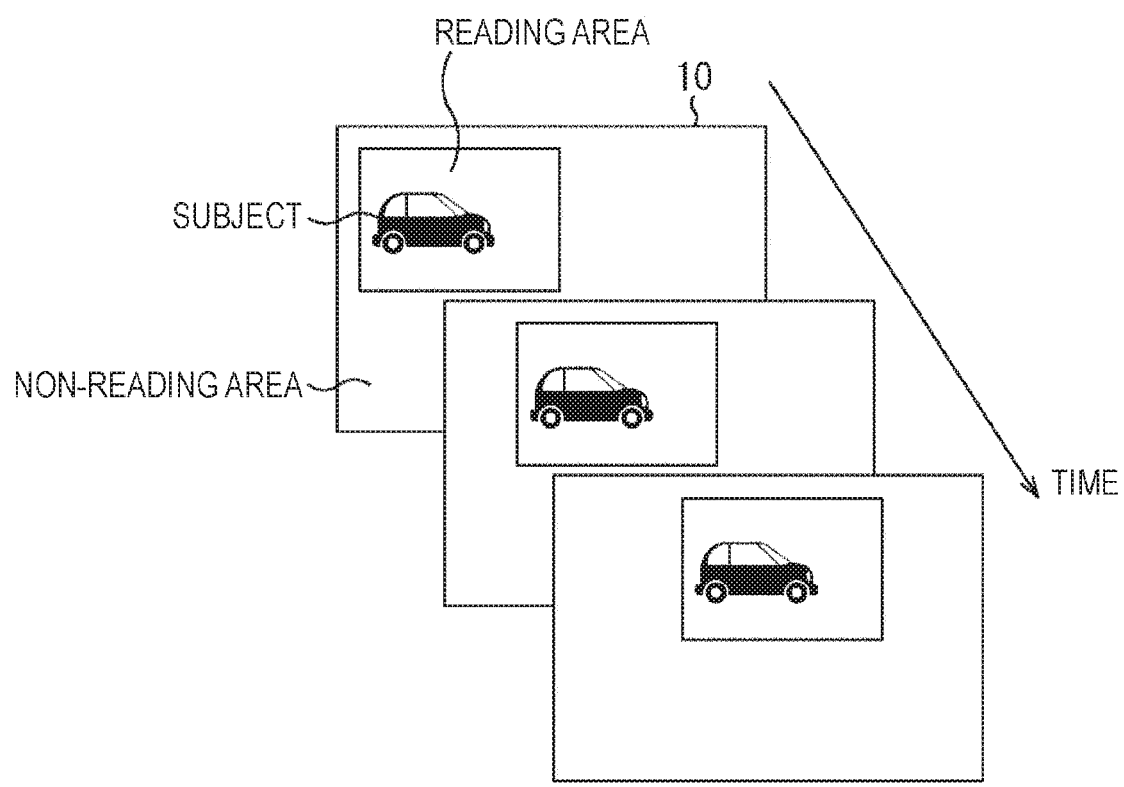
FIG. 2 is a diagram for explaining an example of reading pixel data from the image sensor.

FIG. 2 is a diagram for explaining an example of reading pixel data from the image sensor in FIG. 1.

Since the image sensor in FIG. 1 adopts the area ADC architecture, it can perform region of interest (ROI) reading as pixel data reading.

As illustrated in FIG. 2, for example, the ROI reading is reading in which a reading area for performing window reading is changed so as to track a subject that is moving (moving subject). In the window reading, pixel data of only pixels within a partial area (reading area) is read from the image sensor rather than reading pixel data of all the pixels constituting one frame.

As described above, in the ROI reading, pixel data of only pixels within the reading area is read, instead of pixel data of all the pixels constituting the pixel substrate 10.

Therefore, in the circuit substrate 20, it is necessary for the signal processing unit 21 responsible for the AD conversion of the pixel signal from a pixel within the reading area to work.

However, it is not necessary for the signal processing unit 21 other than the signal processing unit 21 responsible for the AD conversion of the pixel signal from a pixel within the reading area to work. Then, in a case where the signal processing unit 21 other than the signal processing unit 21 responsible for the AD conversion of the pixel signal from a pixel within the reading area is not caused to work, the power consumption can be reduced as compared with a case where the aforementioned signal processing unit 21 is caused to work.

Therefore, the present technology can achieve low power consumption by controlling the action of the signal processing unit 21 constituting the circuit substrate 20.

Configuration Example of Circuit Substrate 20

Figure 3:
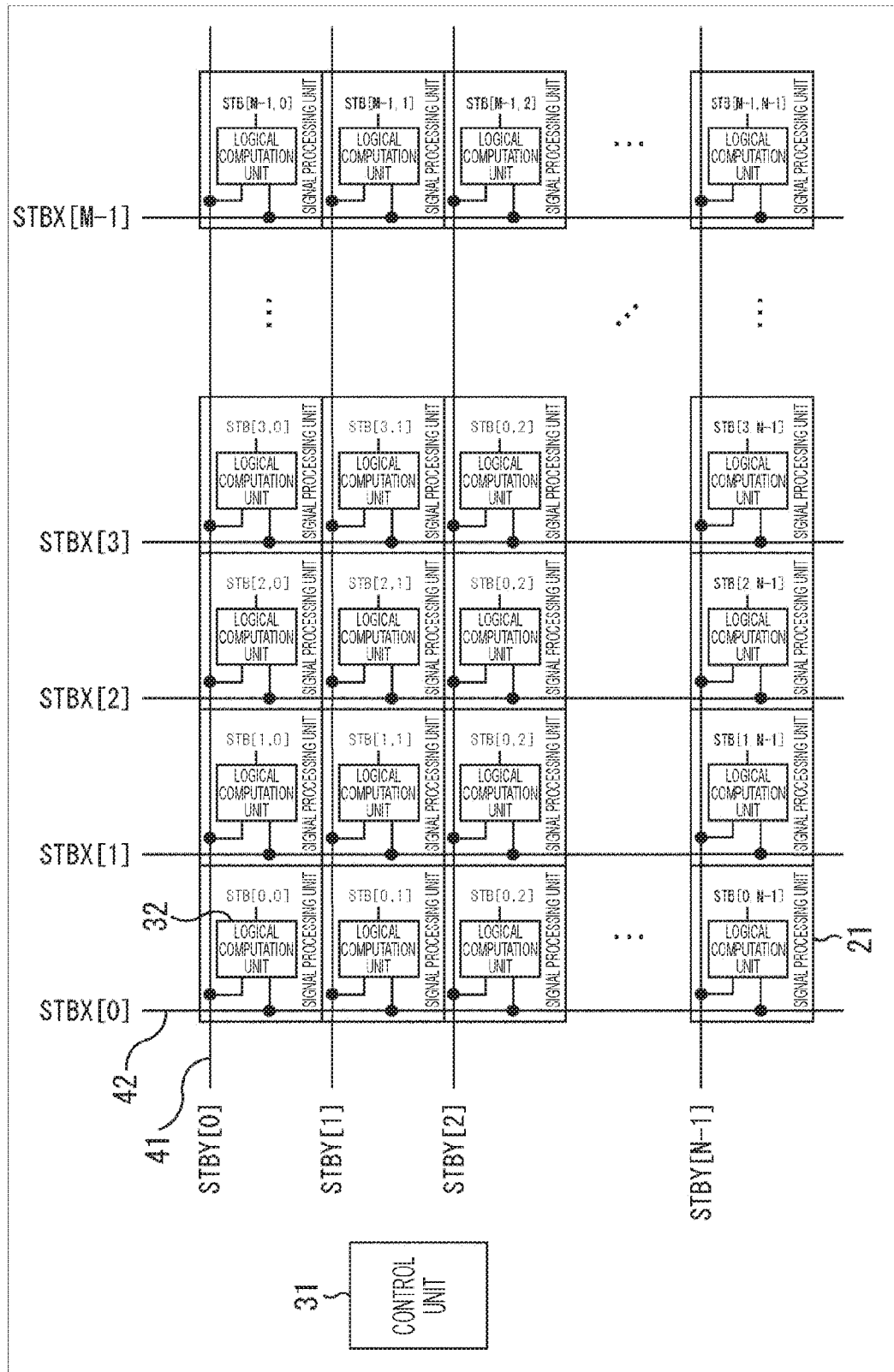
FIG. 3 is a block diagram illustrating a configuration example of a circuit substrate 20.

FIG. 3 is a block diagram illustrating a configuration example of the circuit substrate 20 in FIG. 1.

As described with reference to FIG. 1, the circuit substrate 20 has the M×N signal processing units 21 in the lateral direction×the longitudinal direction.

In addition, the circuit substrate 20 has a control unit 31, M×N number of logical computation units 32, horizontal control lines 41 being the same in number as the number N of the signal processing units 21 in a vertical (longitudinal) direction, and vertical control lines 42 being the same in number as the number M of the signal processing units 21 in a horizontal (lateral) direction.

The control unit 31 controls the action of the signal processing unit 21 by supplying a control signal to each of the horizontal control lines 41 and the vertical control lines 42.

The logical computation unit 32, for example, constitutes apart of the signal processing unit 21 and performs a logical computation using a control signal supplied via the horizontal control line 41 and a control signal supplied via the vertical control line 42 as inputs.

The signal processing unit 21 works in accordance with a computation result of the logical computation by the logical computation unit 32 included in this signal processing unit 21.

The horizontal control line 41 is wired in each row of the M×N signal processing units 21. Therefore, the horizontal control lines 41 are wired in the same number as the number of rows (the number in the vertical direction) N of the signal processing units 21.

The vertical control line 42 is wired in each column of the M×N signal processing units 21. Therefore, the vertical control lines 42 are wired in the same number as the number of columns (the number in the horizontal direction) M of the signal processing units 21.

Here, the control signal supplied to the logical computation unit 32 via the horizontal control line 41 is also referred to as a horizontal control signal and a horizontal control signal flowing to the (n+1)th horizontal control line 41 from the top is also noted as a horizontal control signal STBY[n] (n=0, 1, . . . , N−1).

Meanwhile, a control signal supplied to the logical computation unit 32 via the vertical control line 42 is also referred to as a vertical control signal and a vertical control signal flowing to the (m+1)th vertical control line 42 from the left is also noted as a vertical control signal STBX[m] (m=0, 1, . . . , M−1).

As described above, in the circuit substrate 20 in FIG. 3, since the N horizontal control lines 41 and the M vertical control lines 42 are provided, actions of the M×N signal processing units 21 can be controlled individually.

It is assumed here that the signal processing unit 21 and the logical computation unit 32 located at the m-th place from the left and the n-th place from the top are also noted as the signal processing unit 21 [m,n] and the logical computation unit 32 [m, n], respectively.

In the present embodiment, in a case where a computation result STB[m,n] of the logical computation in the logical computation unit 32[m,n] using the horizontal control signal STBY[n] and the vertical control signal STBX[m] as inputs is at, for example, an H level among high (H) and low (L) levels, the signal processing unit 21 [m, n] enters, for example, a standby state (inactive state).

Meanwhile, in a case where the computation result STB [m, n] is at the L level, the signal processing unit 21 [m,n] enters, for example, an active state.

Here, it is possible to provide only the N horizontal control lines 41 or to provide only the M vertical control lines 42 on the circuit substrate 20 out of the N horizontal control lines 41 and the M vertical control lines 42.

However, in a case where only the N horizontal control lines 41 are provided, the actions of the M×N signal processing units 21 cannot be controlled for each individual signal processing unit 21 but controlled for the signal processing units 21 in row units.

Similarly, in a case where only the M vertical control lines 42 are provided, the actions of the M×N signal processing units 21 cannot be controlled for each individual signal processing unit 21 but controlled for the signal processing units 21 in column units.

Action of Circuit Substrate 20

Figure 4:
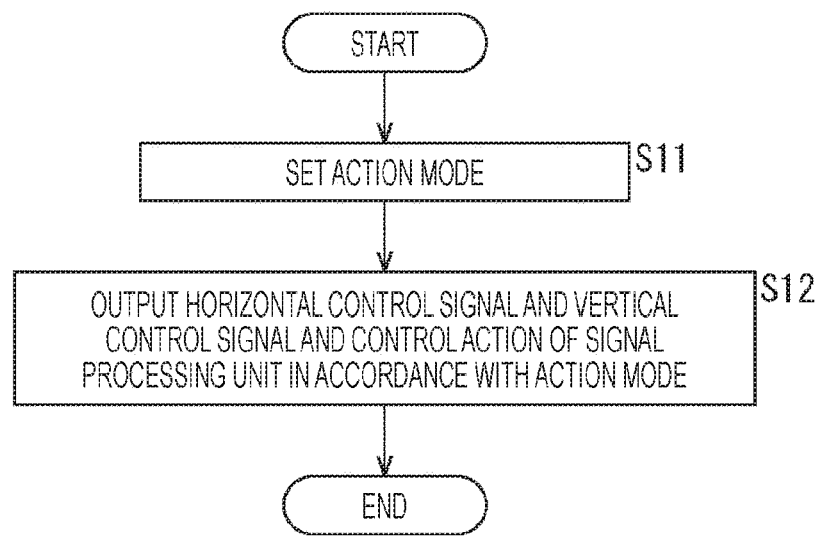
FIG. 4 is a flowchart for explaining the action of the circuit substrate 20.

FIG. 4 is a flowchart for explaining the action of the circuit substrate 20 in FIG. 3.

In step S11, the control unit 31 sets an action mode of whether the ROI reading is to be performed or the like in accordance with, for example, a user operation and the processing proceeds to step S12.

In step S12, the control unit 31 outputs the horizontal control signal and the vertical control signal and controls the action of the signal processing unit 21 in accordance with the action mode.

That is, the horizontal control signal and the vertical control signal output by the control unit 31 are supplied to the logical computation unit 32 via the horizontal control line 41 and the vertical control line 42, respectively.

The logical computation unit 32 performs a logical computation using the horizontal control signal and the vertical control signal as inputs and outputs a computation result thereof.

The signal processing unit 21 enters the active state or the standby state in accordance with the computation result output by the logical computation unit 32 included in this signal processing unit 21.

The signal processing unit 21 that has entered the active state performs signal processing such as the AD conversion of the pixel signal output by the pixel in the pixel block 11 for which this signal processing unit 21 is responsible.

On the other hand, the signal processing unit 21 that has entered the standby state stops its action and does not perform signal processing.

First Configuration Example of Logical Computation Unit 32

Figure 5:
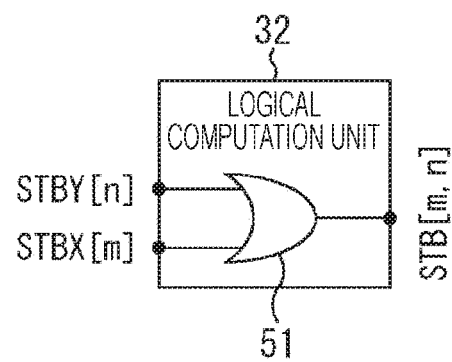
FIG. 5 is a circuit diagram illustrating a first configuration example of a logical computation unit 32.

FIG. 5 is a circuit diagram illustrating a first configuration example of the logical computation unit 32 in FIG. 3.

In FIG. 5, the logical computation unit 32 has an OR gate 51.

The OR gate 51 computes a logical sum of the horizontal control signal STBY[n] and the vertical control signal STBX[m] to output as the computation result STB[m,n].

Therefore, in FIG. 5, in a case where at least one of the horizontal control signal STBY[n] and the vertical control signal STBX[m] is at the H level, the computation result STB[m,n] becomes the H level.

Meanwhile, the computation result STB[m,n] becomes the L level only in a case where both of the horizontal control signal STBY[n] and the vertical control signal STBX[m] are at the L level.

As described above, in a case where the logical computation unit 32 computes the logical sum of the horizontal control signal STBY[n] and the vertical control signal STBX[m], all the signal processing units 21 in the (n+1)th row (the (n+1)th row from the top) enter the standby state when the horizontal control signal STBY[n] is at the H level.

Similarly, when the vertical control signal STBX[m] is at the H level, all the signal processing units 21 in the (m+1)th column (the (m+1)th column from the left) enter the standby state.

Therefore, according to the logical computation unit 32 constituted by the OR gate 51, only the signal processing unit 21 responsible for (signal processing of the pixel signal output by) the pixel block 11 in the reading area for which the pixel data is to be read in the ROI reading, among the M×N pixel blocks 11, can be placed in the active state and, at the same time, the signal processing unit 21 responsible for the pixel block 11 in an area other than the reading area can be placed in the standby state.

Figure 6:
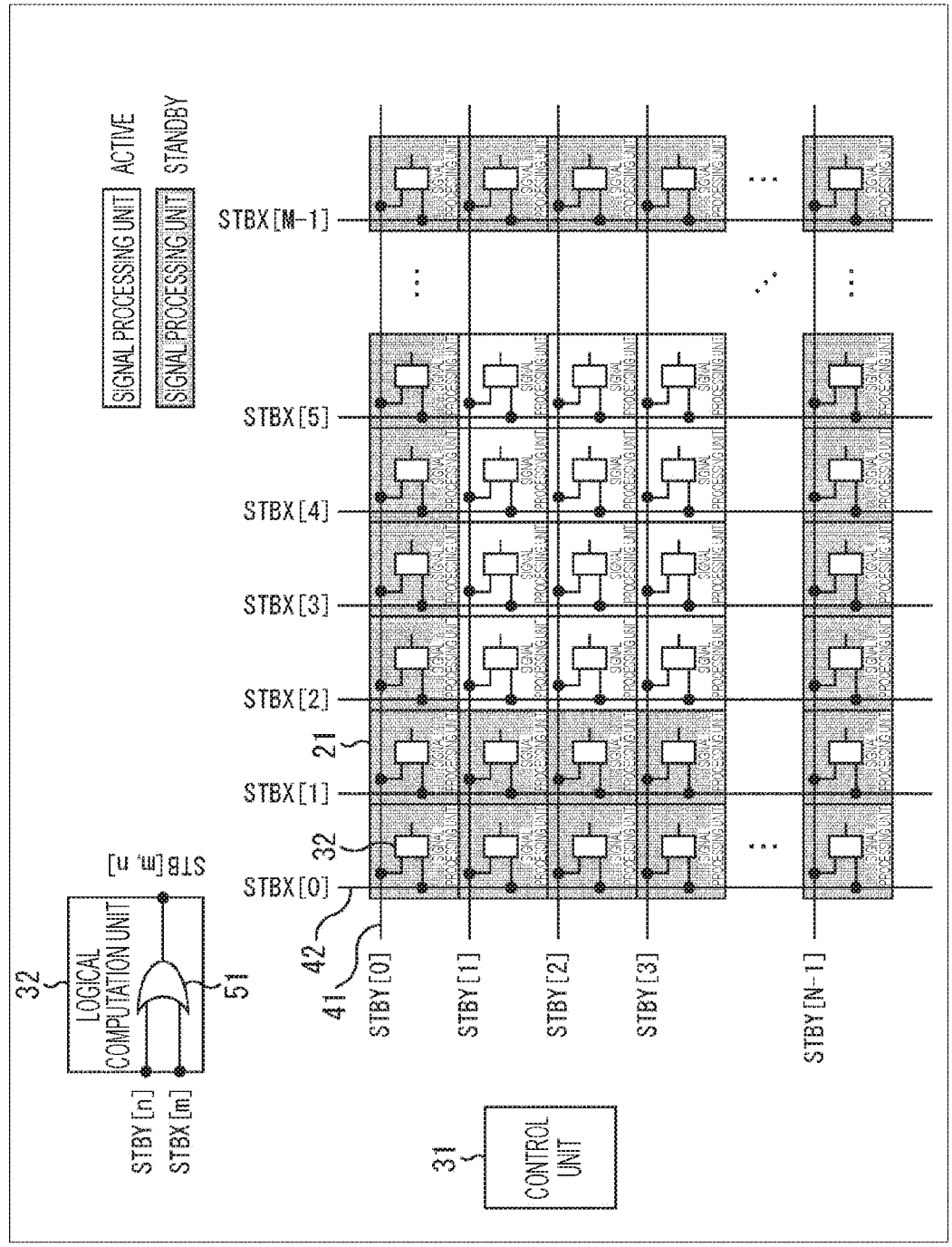
FIG. 6 is a diagram for explaining an example of the action of a signal processing unit 21 controlled in accordance with a computation result of the logical computation unit 32 constituted by an OR gate 51.

FIG. 6 is a diagram for explaining an example of the action of the signal processing unit 21 controlled in accordance with a computation result of the logical computation unit 32 constituted by the OR gate 51.

Note that, in FIG. 6 (the same applies to the following figures), a shaded signal processing unit 21 represents the signal processing unit 21 in the standby state, whereas an unshaded signal processing unit 21 represents the signal processing unit 21 in the active state.

In FIG. 6, the vertical control signals STBX[0], STBX[1], and STBX[M−1] and the horizontal control signals STBY[0] and STBY[N−1] are at the H level, while the other vertical control signals and the other horizontal control signals are at the L level.

As a result, in FIG. 6, among the M×N signal processing units 21 [m,n], the signal processing units 21 located within a rectangular area with a line segment connecting the signal processing units 21[2,1] and 21 [M−2,N−2] as a diagonal line are in the active state and the other signal processing units 21 (the signal processing units 21 in the first row and the (N−1) th row, and in the first column, the second column, and the (M−1) th column) are in the standby state.

Therefore, in FIG. 6, only the signal processing units 21 within the rectangular area among the M×N signal processing units 21 are placed in the active state such that signal processing such as the AD conversion can be performed on the pixel signals output by the pixel blocks 11 within this rectangular area. As a result, pixel data of all the pixels constituting one frame is not read from the image sensor but pixel data of only pixels within a partial area (reading area) is read therefrom.

As described thus far, since only the signal processing units 21 within the rectangular area among the M×N signal processing units 21 can be placed in the active state and the other signal processing units 21 can be placed in the standby state, it is possible to achieve low power consumption.

Figure 7A:
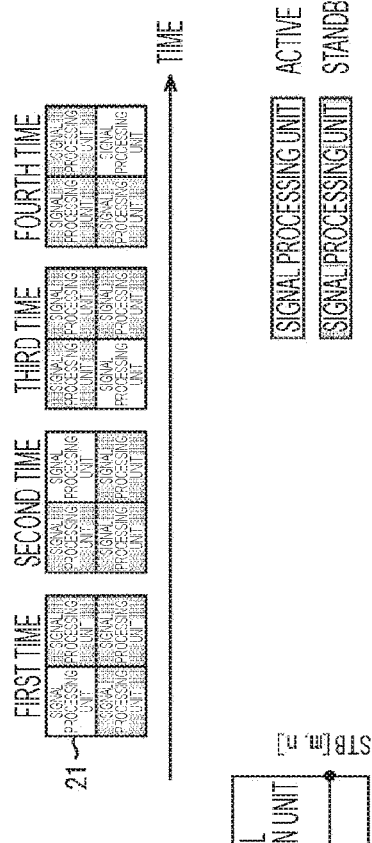
FIGS. 7A and 7B are diagrams for explaining another example of the action of the signal processing unit 21 controlled in accordance with a computation result of the logical computation unit 32 constituted by the OR gate 51.
Figure 7B:
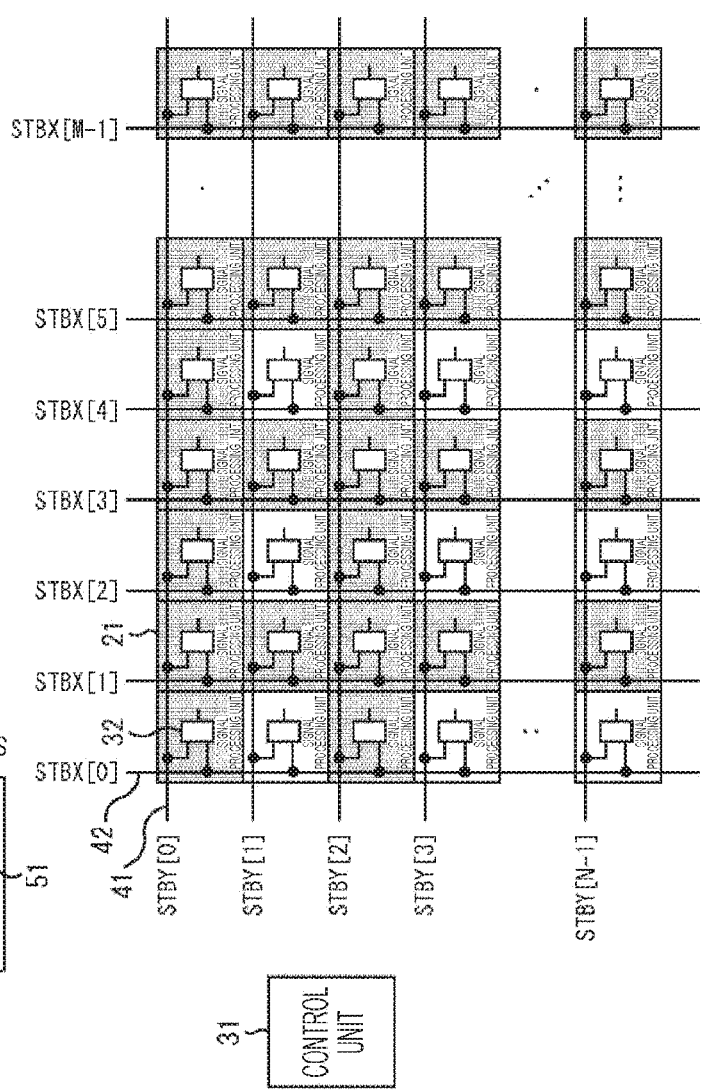

FIGS. 7A and 7B are diagrams for explaining another example of the action of the signal processing unit 21 controlled in accordance with a computation result of the logical computation unit 32 constituted by the OR gate 51.

In FIGS. 7A and 7B, switching between the vertical control signal and the horizontal control signal is periodically performed with four times of the switching between the vertical control signal and the horizontal control signal as one cycle.

That is, in FIGS. 7A and 7B, when attention is focused on the signal processing units 21 in 2×2 units in the lateral direction×the longitudinal direction on the circuit substrate 20, the 2×2 signal processing units 21 are periodically placed in the active state one by one.

FIG. 7A illustrates how the signal processing units 21 in 2×2 units periodically enter the active state one by one.

In first switching, the vertical control signals STBX[$2i$] in odd-numbered columns and the horizontal control signals [$2j$] in odd-numbered rows are set to the L level, while the vertical control signals STBX[$2i+1$] in the even-numbered columns and the horizontal control signals [$2j+1$] in the even-numbered columns are set to the H level ($i=0, 1, \ldots, (M-1)/2$) ($j=0, 1, \ldots, (N-1)/2$).

In this case, as illustrated in FIG. 7A, only the upper left signal processing unit 21 among the 2×2 signal processing units 21 in the lateral direction×the longitudinal direction enters the active state and the remaining three signal processing units 21 enter the standby state.

In second switching, the vertical control signals STBX[$2i+1$] in the even-numbered columns and the horizontal control signals [$2j$] in the odd-numbered rows are set to the L level, while the vertical control signals STBX[$2i$] in the odd-numbered columns and the horizontal control signals [$2j+1$] in the even-numbered columns are set to the H level.

In this case, as illustrated in FIG. 7A, only the upper right signal processing unit 21 among the 2×2 signal processing units 21 in the lateral direction×the longitudinal direction enters the active state and the remaining three signal processing units 21 enter the standby state.

In third switching, the vertical control signals STBX[$2i$] in the odd-numbered columns and the horizontal control signals [$2j+1$] in the even-numbered rows are set to the L level, while the vertical control signals STBX[$2i+1$] in the even-numbered columns and the horizontal control signals [$2j$] in the odd-numbered columns are set to the H level.

In this case, as illustrated in FIG. 7A, only the lower left signal processing unit 21 among the 2×2 signal processing units 21 in the lateral direction×the longitudinal direction enters the active state and the remaining three signal processing units 21 enter the standby state.

In fourth switching, the vertical control signals STBX[$2i+1$] in the even-numbered columns and the horizontal control signals [$2j+1$] in the even-numbered rows are set to the L level, while the vertical control signals STBX[$2i$] in the odd-numbered columns and the horizontal control signals [$2j$] in the odd-numbered columns are set to the H level.

In this case, as illustrated in FIG. 7A, only the lower right signal processing unit 21 among the 2×2 signal processing units 21 in the lateral direction×the longitudinal direction enters the active state and the remaining three signal processing units 21 enter the standby state.

FIG. 7B illustrates details of how only the lower left signal processing unit 21 among the signal processing units 21 in 2×2 units is in the active state.

In FIG. 7B, the vertical control signals STBX[$2i$] in the odd-numbered columns and the horizontal control signals [$2j+1$] in the even-numbered rows are set to the L level, while the vertical control signals STBX[$2i+1$] in the even-numbered columns and the horizontal control signals [$2j$] in the odd-numbered columns are set to the H level.

As described thus far, by periodically switching between the vertical control signal and the horizontal control signal with four times of the switching between the vertical control signal and the horizontal control signal as one cycle, the 2×2 signal processing units 21 can be periodically placed in the active state one by one in units of these 2×2 signal processing units 21.

For example, in a case where there is no need to read pixel data from the image sensor at a high speed, as illustrated in FIGS. 7A and 7B, the 2×2 signal processing units 21 are periodically placed in the active state one by one in units of these 2×2 signal processing units 21, whereby the number of the signal processing units 12 working concurrently can be reduced and low power consumption can be achieved.

Note that, it is possible to periodically place the signal processing units 21 in the active state one by one as described above in, for example, 3×units or 4×2 units, in addition to 2×2 units.

Second Configuration Example of Logical Computation Unit 32

Figure 8:
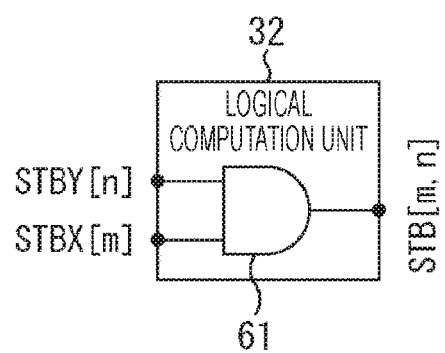
FIG. 8 is a circuit diagram illustrating a second configuration example of the logical computation unit 32.

FIG. 8 is a circuit diagram illustrating a second configuration example of the logical computation unit 32 in FIG. 3.

In FIG. 8, the logical computation unit 32 has an AND gate 61.

The AND gate 61 computes a logical product of the horizontal control signal STBY[n] and the vertical control signal STBX[m] to output as the computation result STB[m,n].

Therefore, in FIG. 8, only in a case where both of the horizontal control signal STBY[n] and the vertical control signal STBX[m] are at the H level, the computation result STB[m,n] becomes the H level.

Meanwhile, the computation result STB[m,n] becomes the L level in a case where at least one of the horizontal control signal STBY[n] and the vertical control signal STBX[m] is at the L level.

As described above, in a case where the logical computation unit 32 computes the logical product of the horizontal control signal STBY[n] and the vertical control signal STBX[m], the signal processing units 21[m,n] in the (n+1)th row and the (m+1)th column enter the standby state only when both of the horizontal control signal STBY[n] and the vertical control signal STBX[m] are at the H level.

Therefore, according to the logical computation unit 32 constituted by the AND gate 61, for example, the signal processing unit 21 responsible for the pixel block 11 for a rectangular foreground area in which the foreground is reflected, among the M×N pixel blocks 11 can be placed in the standby state and, at the same time, only the signal processing unit 21 responsible for the pixel block 11 for an area excluding the foreground area can be placed in the active state. In this case, for example, pixel data of only the background can be obtained.

Figure 9:
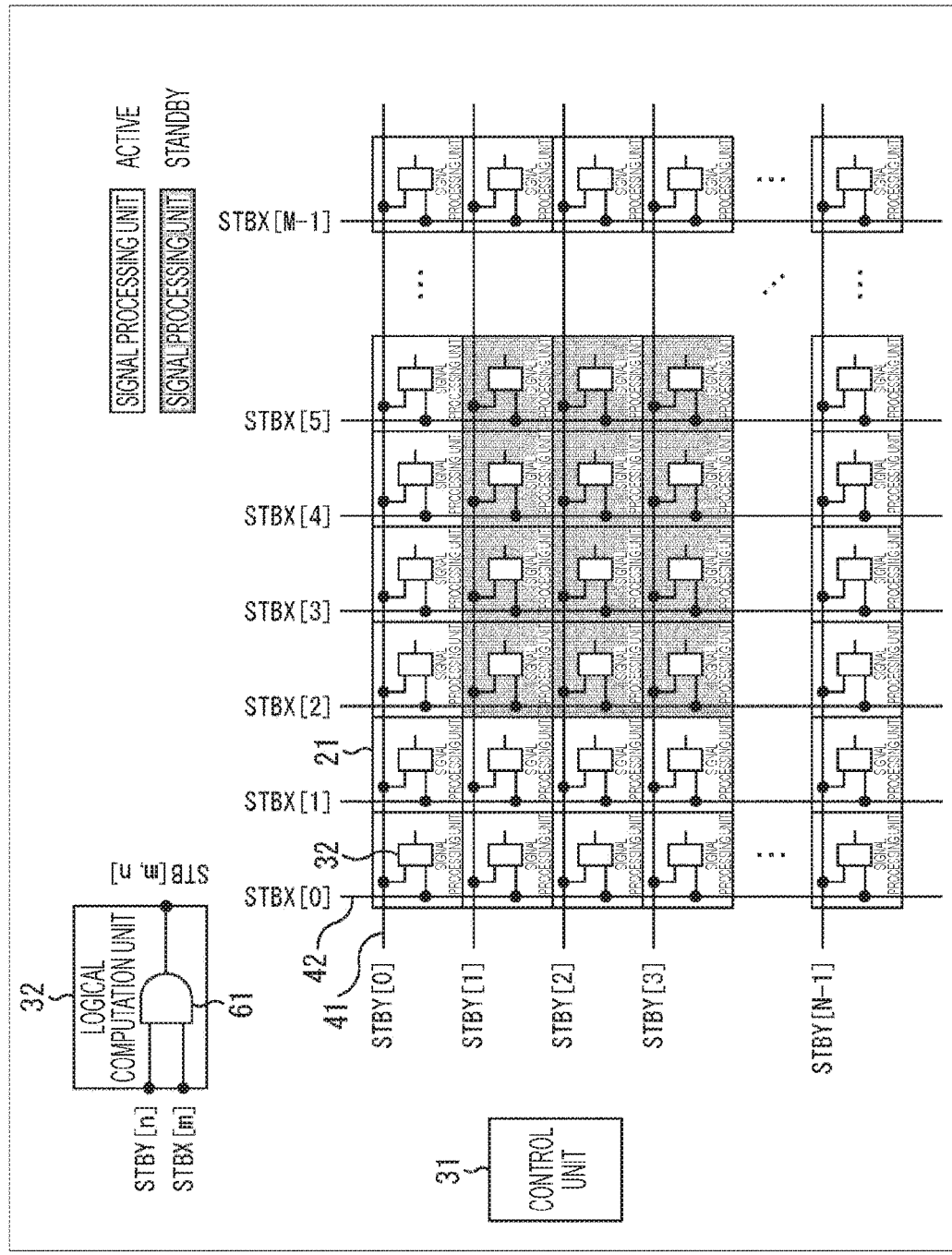
FIG. 9 is a diagram for explaining an example of the action of the signal processing unit 21 controlled in accordance with a computation result of the logical computation unit 32 constituted by an AND gate 61.

FIG. 9 is a diagram for explaining an example of the action of the signal processing unit 21 controlled in accordance with a computation result of the logical computation unit 32 constituted by the AND gate 61.

In FIG. 9, the vertical control signals STBX[2] to STBX[M−2] and the horizontal control signals STBY[1] to STBY[N−2] are at the H level, while the other vertical control signals and the other horizontal control signals are at the L level.

As a result, in FIG. 9, the signal processing units 21 located within a rectangular area with a line segment connecting the signal processing units 21[2,1] and 21[M−2,N−2] as a diagonal line are in the standby state and the other signal processing units 21 (the signal processing units 21 in the first row and the (N−1)th row, and in the first column, the second column, and the (M−1)th column) are in the active state.

Therefore, in FIG. 9, only the signal processing units 21 within an area other than the rectangular area among the M×N signal processing units 21 are placed in the active state such that signal processing such as the AD conversion can be performed on the pixel signals output by the pixel blocks 11 within this area. As a result, pixel data of all the pixels constituting one frame is not read from the image sensor but pixel data of only pixels within a partial area is read therefrom.

As described thus far, since only the signal processing units 21 within an area other than the rectangular area among the M×N signal processing units 21 can be placed in the active state and the other signal processing units 21 can be placed in the standby state, it is possible to achieve low power consumption.

Third Configuration Example of Logical Computation Unit 32

Figure 10:
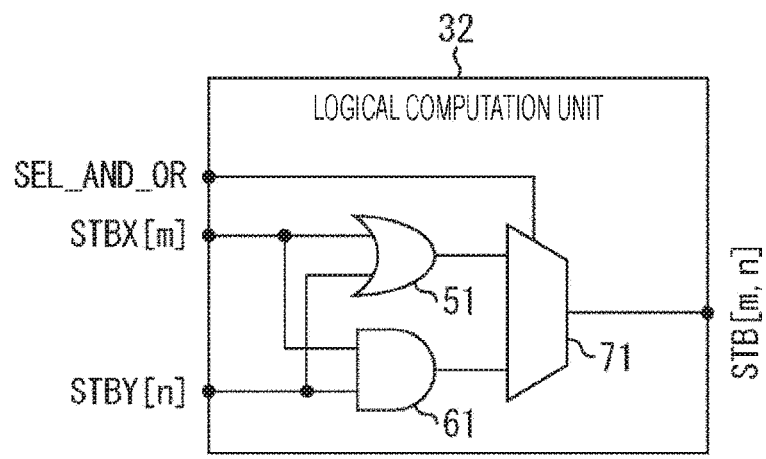
FIG. 10 is a circuit diagram illustrating a third configuration example of the logical computation unit 32.

FIG. 10 is a circuit diagram illustrating a third configuration example of the logical computation unit 32 in FIG. 3.

Note that, in FIG. 10, constituent members corresponding to those in the case of FIG. 5 or 8 are denoted with the same reference numerals and the description thereof will be omitted as appropriate below.

In FIG. 10, the logical computation unit 32 has the OR gate 51 in FIG. 5, the AND gate 61 in FIG. 8, and a selector 71.

The computation result output by the OR gate 51 (the logical sum of the horizontal control signal STBY[n] and the vertical control signal STBX[m]) and the computation result output by the AND gate 61 (the logical product of the horizontal control signal STBY[n] and the vertical control signal STBX[m]) are supplied to the selector 71.

Furthermore, a selection signal SEL_AND_OR as the control signal for controlling the selector 71 is supplied from the control unit 31 to the selector 71.

The selector 71 is a selection unit that selects one of the logical sum of the OR gate 51 and the logical product of the AND gate 61 in accordance with the selection signal SEL_AND_OR and outputs the one selected from the logical sum and the logical product as the computation result STB[m,n] of the logical computation.

Therefore, according to the logical computation unit 32 in FIG. 10, by selecting the logical sum of the OR gate 51 in the selector 71, as described with reference to FIGS. 5 to 7, when the horizontal control signal STBY[n] is at the H level, all of the signal processing units 21 in the (n+1)th row can be placed in the standby state and, when the vertical control signal STBX[m] is at the H level, all of the signal processing units 21 in the (m+1)th column can be placed in the standby state.

Meanwhile, according to the logical computation unit 32 in FIG. 10, by selecting the logical product of the AND gate 61 in the selector 71, as described with reference to FIGS. 8 and 9, only when both of the horizontal control signal STBY[n] and the vertical control signal STBX[m] are at the H level, the signal processing units 21[m,n] in the (n+1)th row and the (m+1)th column can be placed in the standby state.

As a supply method of supplying the selection signal SEL_AND_OR to the logical computation unit 32, a first supply method that supplies the same selection signal SEL_AND_OR to the M×N logical computation units 32 can be adopted.

In addition, as a supply method of supplying the selection signal SEL_AND_OR to the logical computation unit 32, a second supply method that supplies the selection signal SEL_AND_OR different for each column or each row to the M×N logical computation units 32 can be adopted.

Furthermore, as a supply method of supplying the selection signal SEL_AND_OR to the logical computation unit 32, a third supply method that supplies the individual selection signal SEL_AND_OR to each of the M×N logical computation units 32 can be adopted.

The second supply method can designate the selection of the logical sum or the logical product in finer units than that in the first supply method. Furthermore, the third supply method can designate the selection of the logical sum or the logical product in finer units than that in the second supply method.

However, in the case of adopting the second supply method, the number of wires for the selection signal SEL_AND_OR from the control unit 31 to the logical computation unit 32 is larger than that in the case of adopting the first supply method. Furthermore, in the case of adopting the third supply method, the number of wires for the selection signal SEL_AND_OR from the control unit 31 to the logical computation unit 32 is larger than that in the case of adopting the third supply method.

Configuration Example of Signal Processing Unit 21

Figure 11:
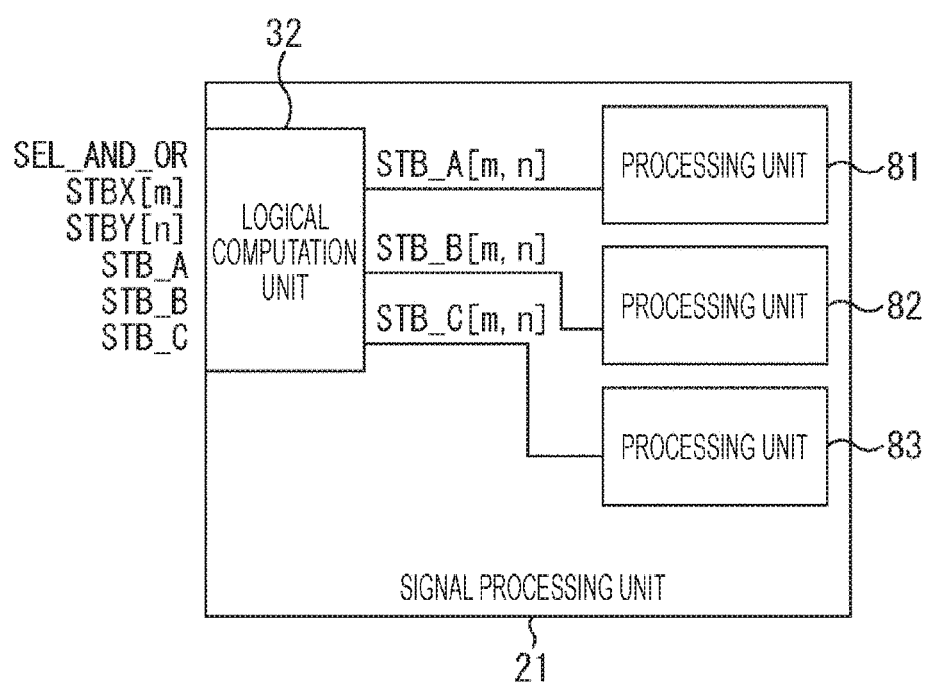
FIG. 11 is a block diagram illustrating a configuration example of the signal processing unit 21.

FIG. 11 is a block diagram illustrating a configuration example of the signal processing unit 21.

In FIG. 11, in addition to the logical computation unit 32, the signal processing unit 21 has three processing units 81, 82, and 83 as a plurality of processing units that performs predetermined processing.

Here, attention is focused on the AD conversion as signal processing performed by the signal processing unit 21 and, for example, it is assumed that slope type AD conversion is performed as this AD conversion.

In the slope type AD conversion, a signal line voltage of a signal line (vertical signal line (VSL)) (not illustrated) through which a pixel on the pixel substrate 10 outputs a pixel signal are compared with a ramp signal of which the voltage decreases with a constant slope and the time until the signal line voltage matches the ramp signal is counted. Then, a count value of that time is output as an AD conversion result of the pixel signal.

In the slope type AD conversion, for example, a comparator that performs processing of comparing the signal line voltage and the ramp signal, a counter that performs processing of counting time, and a current source that performs processing of flowing a current to the signal line are necessary.

In a case where the slope type AD conversion is performed as the signal processing of the signal processing unit 21, the three processing units 81 to 83 correspond to, for example, the comparator, the counter, and the current source, respectively.

In FIG. 11, the selection signal SEL_AND_OR, the vertical control signal STBX[m], the horizontal control signal STBY[n], and designation signals STB_A, STB_B, and STB_C are supplied from the control unit 31 to the logical computation unit 32.

The logical computation unit 32 performs a logical computation using the selection signal SEL_AND_OR, the vertical control signal STBX[m], the horizontal control signal STBY[n], and the designation signals STB_A, STB_B, and STB_C as inputs and outputs computation results STB_A[m,n], STB_B[m,n], and STB_C[m,n] of this logical computation.

Here, the designation signals STB_A, STB_B, and STB_C are, for example, signals designating a target of which the action is to be controlled to standby.

That is, in a case where the processing unit 81 is specified as a control target to be controlled to the standby state (hereinafter also referred to as a standby control target), the designation signal STB_A is set to, for example, the H level among the H and L levels. Similarly, in a case where the processing unit 82 is specified as the standby control target, the designation signal STB_B is set to the H level and, in a case where the processing unit 83 is specified as the standby control target, the designation signal STB_C is set to the H level.

The computation results STB_A[m,n], STB_B[m,n], and STB_C[m,n] output by the logical computation unit 32 are separately supplied to the respective processing units 81 to 83.

The processing units 81 to 83 separately work in accordance with the respective computation results STB_A[m,n], STB_B[m,n], and STB_C[m,n].

That is, in a case where the computation result STB_A[m,n] is at, for example, the H level among the H and L levels, the processing unit 81 enters, for example, the standby state among the active state and the standby state and, in a case where the computation result STB_A[m,n] is at the L level, the processing unit 81 enters the active state.

Similarly, in a case where the computation result STB_B[m,n] is at the H level, the processing unit 82 enters the standby state and, in a case where the computation result STB_B[m,n] is at the L level, the processing unit 82 enters the active state. In addition, in a case where the computation result STB_C[m,n] is at the H level, the processing unit 83 enters the standby state and, in a case where the computation result STB_C[m,n] is at the L level, the processing unit 83 enters the active state.

Note that, as a supply method of supplying the designation signal STB_A to the logical computation unit 32, a first supply method that supplies the same designation signal STB_A to the M×N logical computation units 32 can be adopted.

Besides, as a supply method of supplying the designation signal STB_A to the logical computation unit 32, as in the case of supplying the selection signal SEL_AND_OR to the logical computation unit 32 described with reference to FIG. 10, a second supply method and a third supply method can be adopted.

The same applies to a supply method of supplying the designation signal STB_B or STB_C to the logical computation unit 32.

Fourth Configuration Example of Logical Computation Unit 32

Figure 12:
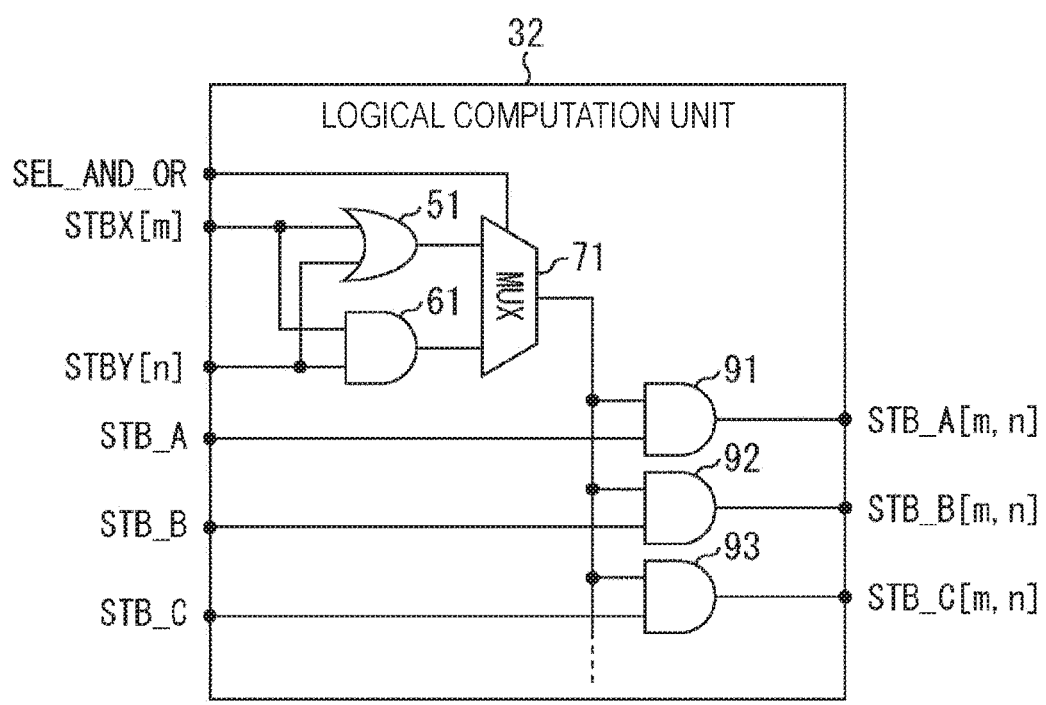
FIG. 12 is a circuit diagram illustrating a fourth configuration example of the logical computation unit 32.

FIG. 12 is a circuit diagram illustrating a fourth configuration example of the logical computation unit 32.

That is, FIG. 12 illustrates a configuration example of the logical computation unit 32 in FIG. 11.

Note that, in FIG. 12, constituent members corresponding to those in the case of FIG. 10 are denoted with the same reference numerals and the description thereof will be omitted as appropriate below.

The logical computation unit 32 in FIG. 12 is like that in the case of FIG. 10 in that it has the OR gate 51, the AND gate 61, and the selector 71.

However, the logical computation unit 32 in FIG. 12 is different from that in the case of FIG. 10 in that AND gates 91, 92, and 93 are newly provided.

The logical sum of the OR gate 51 or the logical product of the AND gate 51 output by the selector 71 is supplied to the AND gates 91 to 93.

Furthermore, the designation signal STB_A is supplied to the AND gate 91, the designation signal STB_B is supplied to the AND gate 92, and the designation signal STB_C is supplied to the AND gate 93.

The AND gate 91 computes the logical product of the logical sum or the logical product output by the selector 71 and the designation signal STB_A to output to the processing unit 81 as the computation result STB_A[m,n].

The AND gate 92 computes the logical product of the logical sum or the logical product output by the selector 71 and the designation signal STB_B to output to the processing unit 82 as the computation result STB_B[m,n].

The AND gate 93 computes the logical product of the logical sum or the logical product output by the selector 71 and the designation signal STB_C to output to the processing unit 83 as the computation result STB_C[m,n].

Therefore, in the AND gate 91, in a case where the designation signal STB_A is at the H level representing that the standby control target is the processing unit 81, the logical sum or the logical product output by the selector 71 is output to the processing unit 81 as the computation result STB_A[m,n]. As a result, the processing unit 81 enters the active state or the standby state in accordance with the logical sum or the logical product output by the selector 71.

In the AND gate 92, in a case where the designation signal STB_B is at the H level representing that the standby control target is the processing unit 82, the logical sum or the logical product output by the selector 71 is output to the processing unit 82 as the computation result STB_B[m,n]. As a result, the processing unit 82 enters the active state or the standby state in accordance with the logical sum or the logical product output by the selector 71.

In the AND gate 93, in a case where the designation signal STB_C is at the H level representing that the standby control target is the processing unit 83, the logical sum or the logical product output by the selector 71 is output to the processing unit 83 as the computation result STB_C[m,n]. As a result, the processing unit 83 enters the active state or the standby state in accordance with the logical sum or the logical product output by the selector 71.

As described thus far, the processing unit 81, 82, or 83 is designated as the standby control target by the designation signal STB_A, STB_B, or STB_C, whereby the action of the processing unit designated by the designation signal STB_A, STB_B, or STB_C among the processing units 81 to 83 can be controlled in accordance with the logical sum or the logical product (of the horizontal control signal and the vertical control signal) output by the selector 71.

That is, the action of each of the processing units 81 to 83 can be individually controlled.

Note that, in a case where the designation signal STB_A is at the L level, the computation result STB_A[m,n], which is the output from the AND gate 91, becomes the L level regardless of the output from the selector 71 and the processing unit 81 enters the active state. Similarly, in a case where the designation signal STB_B is at the L level, the processing unit 82 enters the active state and, in a case where the designation signal STB_C is at the L level, the processing unit 83 enters the active state.

Example of Use of Image Pickup Element

Figure 13:
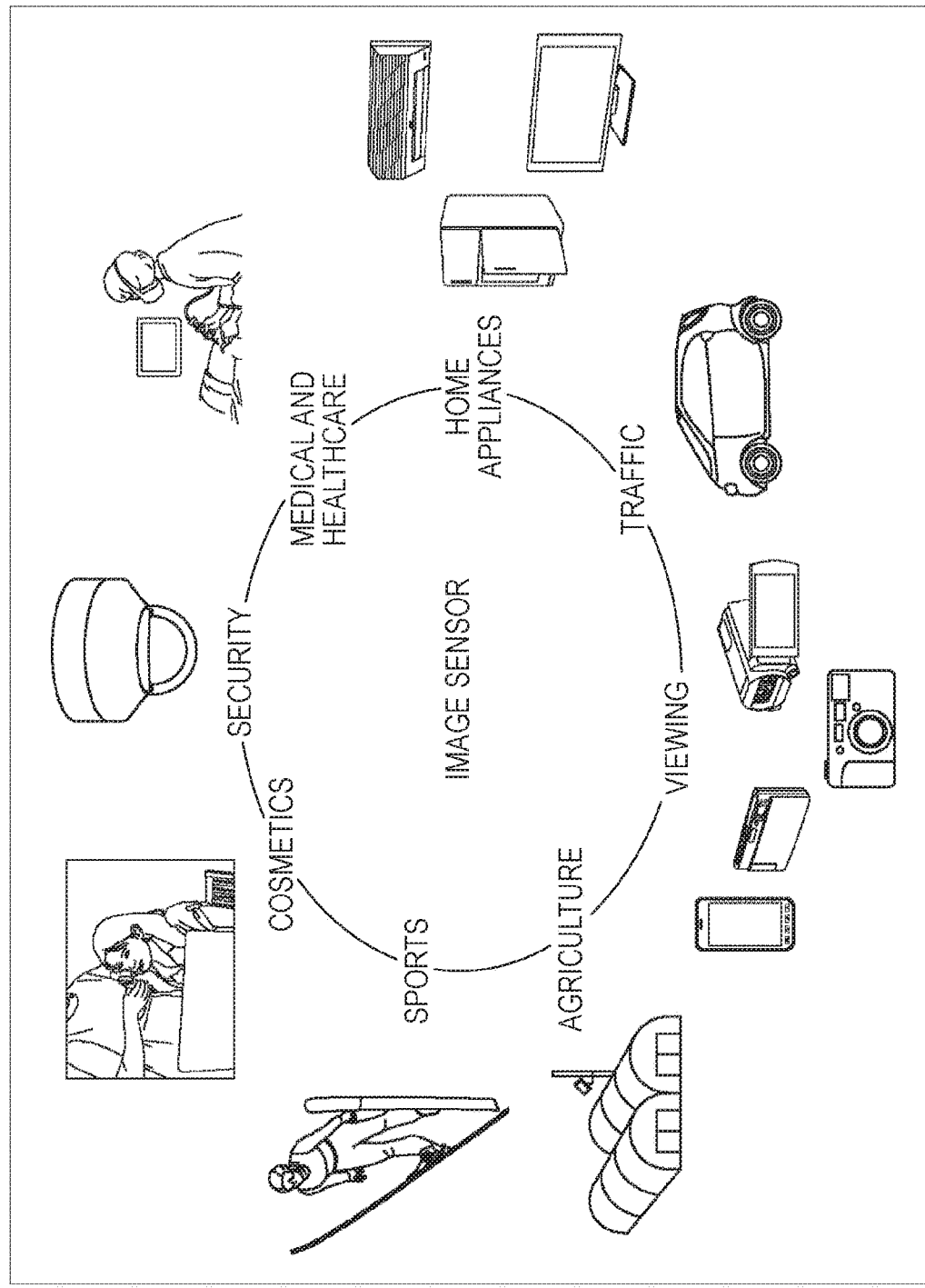
FIG. 13 is a diagram illustrating an example of use using the image sensor.

FIG. 13 is a diagram illustrating an example of use using the image sensor in FIG. 1.

For example, the above-described image sensor can be used for various electronic apparatuses that sense light such as visible light, infrared light, ultraviolet light, and X-ray, as described below.

An electronic apparatus that captures an image to be used for viewing purposes, such as digital cameras or portable apparatuses with a camera function.

An electronic apparatus used for traffic purposes, such as in-vehicle sensors that capture images of the front, back, surroundings, inside, and so on of an automobile for, for example, safe driving such as automatic stop and recognition of the state by the driver, a surveillance camera that monitors traveling vehicles and roads, and a distance measuring sensor that measures a distance between vehicles, and so on.

An electronic apparatus used for home appliances such as TVs, refrigerators, and air conditioners to capture an image of a gesture of a user such that an apparatus is operated in accordance with the gesture.

An electronic apparatus used for medical and healthcare purposes, such as endoscopes and devices that perform angiography by receiving infrared light.

An electronic apparatus used for security purposes, such as surveillance cameras for crime prevention use and cameras for person authentication use.

An electronic apparatus used for cosmetic purposes, such as skin measuring instruments that capture images of skin and microscopes that capture images of the scalp.

An electronic apparatus used for sports purposes, such as action cameras and wearable cameras for sports use.

An electronic apparatus used for agricultural purposes, such as cameras for monitoring the condition of fields and crops.

Digital Camera to which Image Sensor Is Applied

Figure 14:
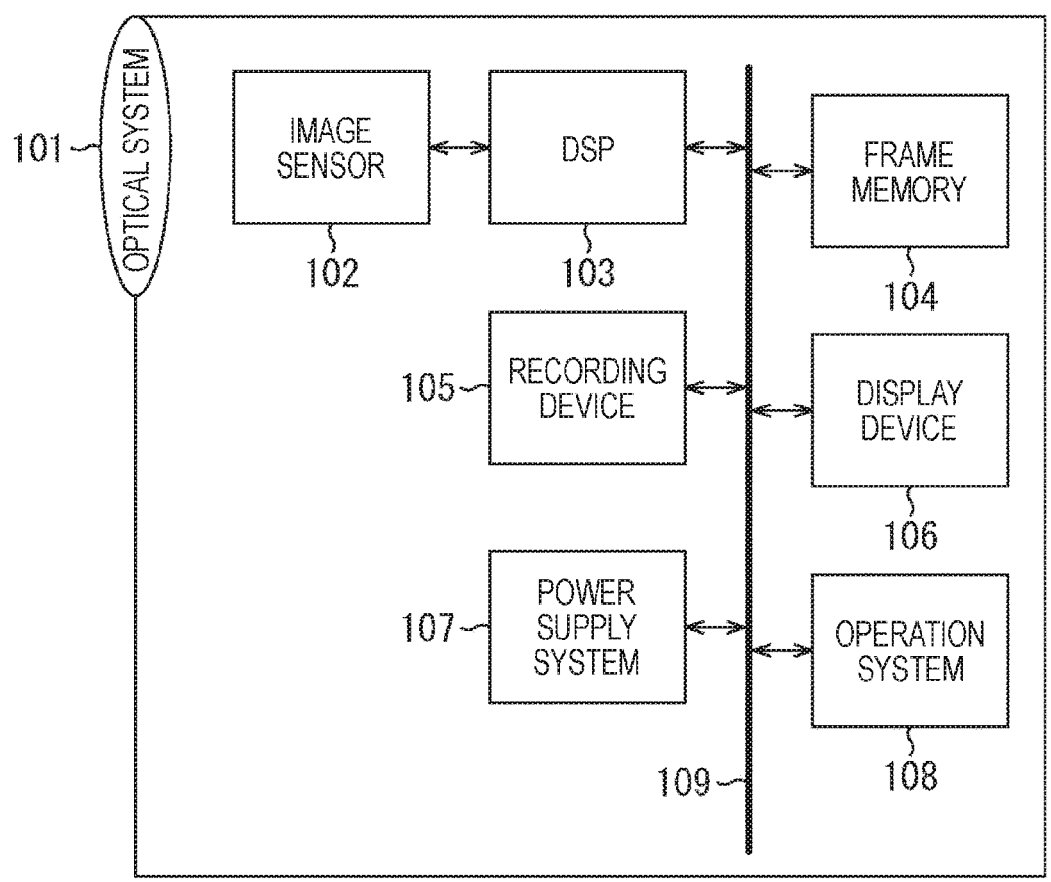
FIG. 14 is a block diagram illustrating a configuration example of one embodiment of a digital camera which is one of electronic apparatuses to which the image sensor is applied.

FIG. 14 is a block diagram illustrating a configuration example of one embodiment of a digital camera which is one of electronic apparatuses to which the image sensor in FIG. 1 is applied.

Both of a still image and a video can be captured with the digital camera.

In FIG. 14, the digital camera has an optical system 101, an image sensor 102, a digital signal processor (DSP) 103, a frame memory 104, a recording device 105, a display device 106, a power supply system 107, an operation system 108, and a bus line 109. In the digital camera, the DSP 103 to the operation system 108 are mutually connected via the bus line 109.

The optical system 101 condenses light from the outside onto the image sensor 102.

The image sensor 102, which is configured similarly to the image sensor in FIG. 1, receives light from the optical system 101 to photoelectrically convert and outputs image data as an electric signal.

The DSP 103 applies necessary signal processing to the image data output by the image sensor 102.

The frame memory 104 temporarily holds the image data to which the signal processing is applied by the DSP 103, in frame units.

The recording device 105 records image data of a video or a still image captured by the image sensor 102 on a recording medium such as a semiconductor memory or a hard disk.

The display device 106 is constituted by, for example, a panel type display device such as a liquid crystal panel or an organic electro luminescence (EL) panel and displays an image (a video or a still image) corresponding to the image data stored in the frame memory 104.

The power supply system 107 supplies necessary power to the image sensor 102 to the display device 106 and the operation system 108.

The operation system 108 outputs operation commands for various functions included in the digital camera in accordance with operations by a user.

Note that the embodiments according to the present technology are not limited to the aforementioned embodiments and various modifications can be made without departing from the scope of the present technology.

For example, the signal processing in the signal processing unit 21 is not limited to the AD conversion.

In addition, the signal processing unit 21 has the three processing units 81 to 83 in FIGS. 11 and 12, but alternatively, the signal processing unit 21 can be configured with two or four or more processing units.

Furthermore, the computation of the horizontal control signal and the vertical control signal is not limited to the logical sum and the logical product and, as the computation of the horizontal control signal and the vertical control signal, another logical computation such as an exclusive logical sum can be adopted.

In addition, the effects described in the present specification merely serve as examples and not construed to be limited. There may be another effect.

Note that the present technology can be also configured as described below.

<1>

An image sensor including:

a pixel substrate on which a plurality of pixels that performs photoelectric conversion and outputs a pixel signal is two-dimensionally arranged;

signal processing units each responsible for signal processing of the pixel signal output from a pixel in one of pixel blocks each made up of one or more pixels on the pixel substrate, the signal processing units being the same in number as the number of the pixel blocks and two-dimensionally arranged;

horizontal control lines being the same in number as the number in a vertical direction of the signal processing units two-dimensionally arranged;

vertical control lines being the same in number as the number in a horizontal direction of the signal processing units two-dimensionally arranged; and a computation unit that performs a computation using a horizontal control signal supplied via each of the horizontal control lines and a vertical control signal supplied via each of the vertical control lines as inputs, in which each of the signal processing units works in accordance with a result of the computation.

<2>

The image sensor according to <1>, in which the computation unit computes a logical sum or a logical product of the horizontal control signal and the vertical control signal.

<3>

The image sensor according to <1>, in which the computation unit has a selection unit that:

computes a logical sum and a logical product of the horizontal control signal and the vertical control signal; and selects one of the logical sum and the logical product.

<4>

The image sensor according to any one of <1> to <3>, in which the signal processing unit has a plurality of processing units that perform predetermined processing, and each of the plurality of processing units works in accordance with a result of the computation.

<5>

The image sensor according to any one of <1> to <4>, further including a control unit that supplies the horizontal control signal to each of the horizontal control lines and supplies the vertical control signal to each of the vertical control lines to control an action of each of the signal processing units.

<6>

The image sensor according to any one of <1> to <5>, in which each of the signal processing units enters an active state or a standby state in accordance with a result of the computation.

<7>

The image sensor according to any one of <1> to <6>, in which each of the signal processing units performs AD conversion of the pixel signal.

<8>

A processing method including a step in which each of signal processing units of an image sensor works in accordance with a result of a computation, the image sensor including:

a pixel substrate on which a plurality of pixels that performs photoelectric conversion and outputs a pixel signal is two-dimensionally arranged;

the signal processing units each responsible for signal processing of the pixel signal output from a pixel in one of pixel blocks each made up of one or more pixels on the pixel substrate, the signal processing units being the same in number as the number of the pixel blocks and two-dimensionally arranged;

horizontal control lines being the same in number as the number in a vertical direction of the signal processing units two-dimensionally arranged;

vertical control lines being the same in number as the number in a horizontal direction of the signal processing units two-dimensionally arranged; and a computation unit that performs the computation using a horizontal control signal supplied via each of the horizontal control lines and a vertical control signal supplied via each of the vertical control lines as inputs.

<9>

An electronic apparatus including:

an optical system that condenses light; and an image sensor that receives light and captures an image, in which the image sensor has:

a pixel substrate on which a plurality of pixels that performs photoelectric conversion and outputs a pixel signal is two-dimensionally arranged;

signal processing units each responsible for signal processing of the pixel signal output from a pixel in one of pixel blocks each made up of one or more pixels on the pixel substrate, the signal processing units being the same in number as the number of the pixel blocks and two-dimensionally arranged;

horizontal control lines being the same in number as the number in a vertical direction of the signal processing units two-dimensionally arranged, vertical control lines being the same in number as the number in a horizontal direction of the signal processing units two-dimensionally arranged; and a computation unit that performs a computation using a horizontal control signal supplied via each of the horizontal control lines and a vertical control signal supplied via each of the vertical control lines as inputs, and each of the signal processing units works in accordance with a result of the computation.

REFERENCE SIGNS LIST

10 Pixel substrate
11 Pixel block
20 Circuit substrate
21 Signal processing unit
31 Control unit
32 Logical computation unit
41 Horizontal control line
42 Vertical control line
51 OR gate
61 AND gate
71 Selector
81 to 83 Processing unit
91 to 93 AND gate
101 Optical system
102 Image sensor
103 DSP
104 Frame memory
105 Recording device
106 Display device
107 Power supply system
108 Operation system
109 Bus line

The invention claimed is:

1. An image sensor, comprising:
a pixel substrate, wherein
   the pixel substrate includes a plurality of pixel blocks in a two-dimensional arrangement,
   each pixel block of the plurality of pixel blocks includes at least one pixel, and
   the at least one pixel of each pixel block of the plurality of pixel blocks is configured to:
      execute photoelectric conversion; and
      output a pixel signal;
a plurality of signal processing units in a two-dimensional arrangement, wherein
   each signal processing unit of the plurality of signal processing units includes a computation unit,
   each signal processing unit of the plurality of signal processing units is configured to process the pixel signal output from the at least one pixel of a corresponding pixel block of the plurality of pixel blocks, and
   a count of the plurality of signal processing units is same as a count of the plurality of pixel blocks;
a plurality of horizontal control lines, wherein
   each horizontal control line of the plurality of horizontal control lines is configured to supply a horizontal control signal,
   a count of the plurality of horizontal control lines is same as a count of a first set of signal processing units of the plurality of signal processing units, and
   the first set of signal processing units is in a vertical direction of the plurality of signal processing units; and
a plurality of vertical control lines, wherein
   each vertical control line of the plurality of vertical control lines is configured to supply a vertical control signal,
   a count of the plurality of vertical control lines is same as a count of a second set of signal processing units of the plurality of signal processing units, and
   the second set of signal processing units is in a horizontal direction of the plurality of signal processing units, wherein
the computation unit of each signal processing unit of the plurality of signal processing units is configured to:
   execute a computation based on the horizontal control signal corresponding to each horizontal control line of the plurality of horizontal control lines and the vertical control signal corresponding to each vertical control line of the plurality of vertical control lines; and
   compute a logical sum or a logical product of the horizontal control signal and the vertical control signal, and
each signal processing unit of the plurality of signal processing units is further configured to work based on a result of the executed computation.

2. The image sensor according to claim 1, wherein
each signal processing unit of the plurality of signal processing units further comprises a plurality of sub-processing units, and
each sub-processing unit of the plurality of sub-processing units is configured to:
   execute a specific process; and
   work based on the result of the executed computation.

3. The image sensor according to claim 1, further comprising a control unit configured to:
supply the horizontal control signal corresponding to each horizontal control line of the plurality of horizontal control lines;
supply the vertical control signal corresponding to each vertical control line of the plurality of vertical control lines; and
control an action of each signal processing unit of the plurality of signal processing units based on the horizontal control signal and the vertical control signal.

4. The image sensor according to claim 1, wherein
each signal processing unit of the plurality of signal processing units is further configured to enter an active state or a standby state based on the result of the executed computation.

5. The image sensor according to claim 1, wherein
each signal processing unit of the plurality of signal processing units is further configured to execute AD conversion of the pixel signal output from the at least one pixel of the corresponding pixel block of the plurality of pixel blocks.

6. An electronic apparatus, comprising:
an optical system configured to condense light; and
an image sensor configured to:
   receive the light; and
   capture an image, wherein
   the image sensor comprises:
      a pixel substrate that includes a plurality of pixel blocks in a two-dimensional arrangement, wherein
         each pixel block of the plurality of pixel blocks includes at least one pixel, and
         the at least one pixel of each pixel block of the plurality of pixel blocks is configured to:
            execute photoelectric conversions; and
            output a pixel signal;
      a plurality of signal processing units in a two-dimensional arrangement, wherein each signal processing unit of the plurality of
signal processing units includes a computation
unit,
each signal processing unit of the plurality of
signal processing units is configured to process
the pixel signal output from the at least one
pixel of a corresponding pixel block of the
plurality of pixel blocks, and
a count of the plurality of signal processing units
is same as a count of the plurality of pixel
blocks;
a plurality of horizontal control lines, wherein
each horizontal control line of the plurality of
horizontal control lines is configured to supply
a horizontal control signal,
a count of the plurality of horizontal control lines
is same as a count of a first set of signal
processing units of the plurality of signal processing units, and
the first set of signal processing units is in a
vertical direction of the plurality of signal processing units; and
a plurality of vertical control lines, wherein
each vertical control line of the plurality of vertical control lines is configured to supply a vertical control signal,
a count of the plurality of vertical control lines is
same as a count of a second set of signal
processing units of the plurality of signal processing units, and
the second set of signal processing units is in a
horizontal direction of the plurality of signal
processing units, wherein
the computation unit of each signal processing unit of
the plurality of signal processing units is configured
to:
execute a computation based on the horizontal control signal corresponding to each horizontal control line of the plurality of horizontal control lines
and the vertical control signal corresponding to
each vertical control line of the plurality of vertical control lines; and
compute a logical sum or a logical product of the
horizontal control signal and the vertical control
signal, and
each signal processing unit of the plurality of signal
processing units is further configured to work based
on a result of the executed computation.
7. An image sensor, comprising:
a pixel substrate, wherein
the pixel substrate includes a plurality of pixel blocks
in a two-dimensional arrangement,
each pixel block of the plurality of pixel blocks
includes at least one pixel, and the at least one pixel of each pixel block of the plurality
of pixel blocks is configured to:
execute photoelectric conversion; and
output a pixel signal;
a plurality of signal processing units in a two-dimensional
arrangement, wherein
each signal processing unit of the plurality of signal
processing units includes a computation unit,
each signal processing unit of the plurality of signal
processing units is configured to process the pixel
signal output from the at least one pixel of a corresponding pixel block of the plurality of pixel blocks,
and
a count of the plurality of signal processing units is
same as a count of the plurality of pixel blocks;
a plurality of horizontal control lines, wherein
each horizontal control line of the plurality of horizontal control lines is configured to supply a horizontal
control signal,
a count of the plurality of horizontal control lines is
same as a count of a first set of signal processing
units of the plurality of signal processing units, and
the first set of signal processing units is in a vertical
direction of the plurality of signal processing units;
and
a plurality of vertical control lines, wherein
each vertical control line of the plurality of vertical
control lines is configured to supply a vertical control
signal,
a count of the plurality of vertical control lines is same
as a count of a second set of signal processing units
of the plurality of signal processing units, and
the second set of signal processing units is in a horizontal direction of the plurality of signal processing
units, wherein
the computation unit of each signal processing unit of the
plurality of signal processing units is configured to
execute a computation based on the horizontal control
signal corresponding to each horizontal control line of
the plurality of horizontal control lines and the vertical
control signal corresponding to each vertical control
line of the plurality of vertical control lines,
the computation unit of each signal processing unit of the
plurality of signal processing units comprises a selection unit configured to:
compute a logical sum and a logical product of the
horizontal control signal corresponding to each horizontal control line of the plurality of horizontal
control lines and the vertical control signal corresponding to each vertical control line of the plurality
of vertical control lines; and
select one of the logical sum and the logical product,
and
each signal processing unit of the plurality of signal
processing units is further configured to work based on
a result of the executed computation.

\* \* \* \* \*